United States Patent Office 3,169,394
Patented Feb. 16, 1965

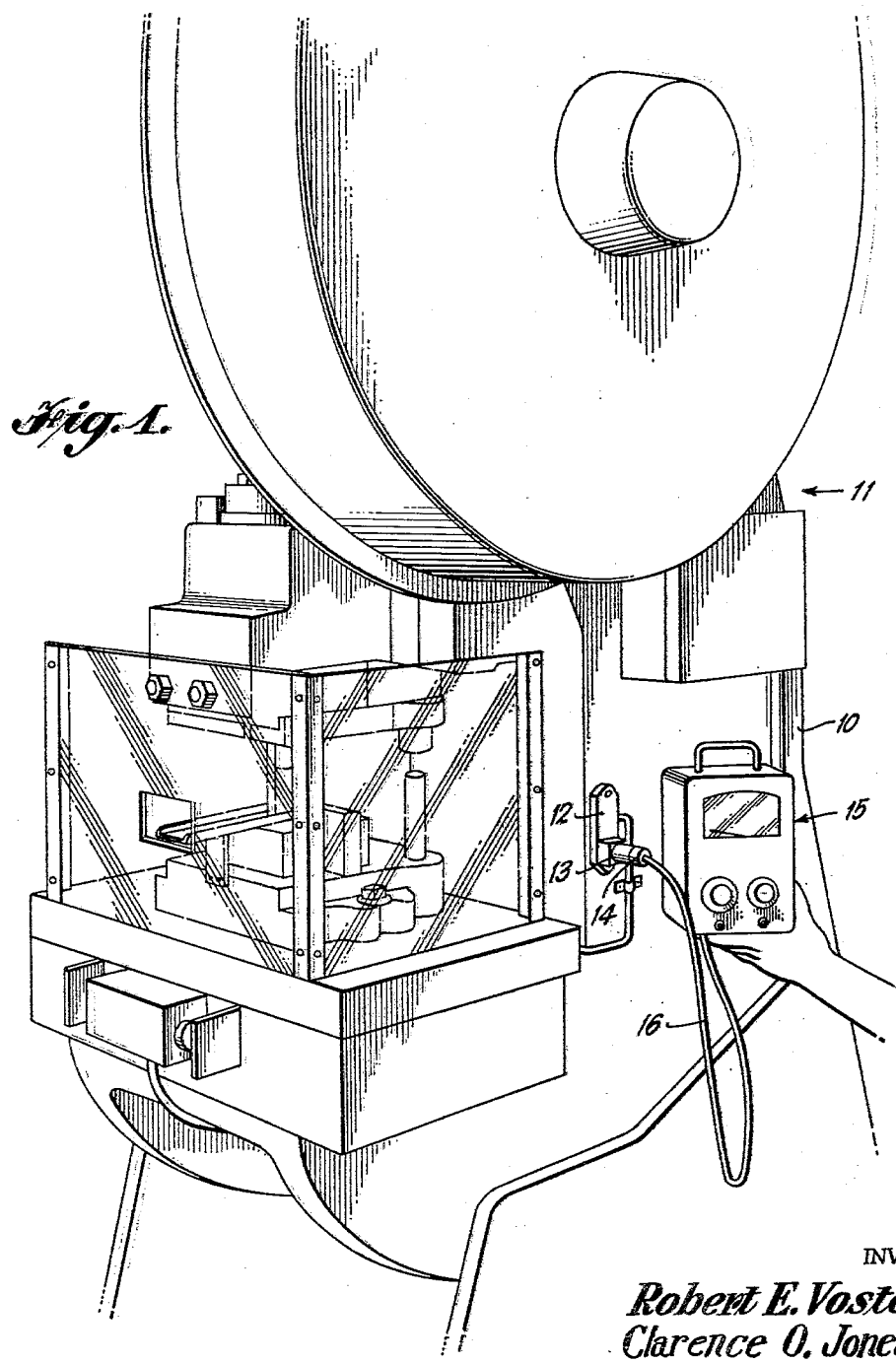

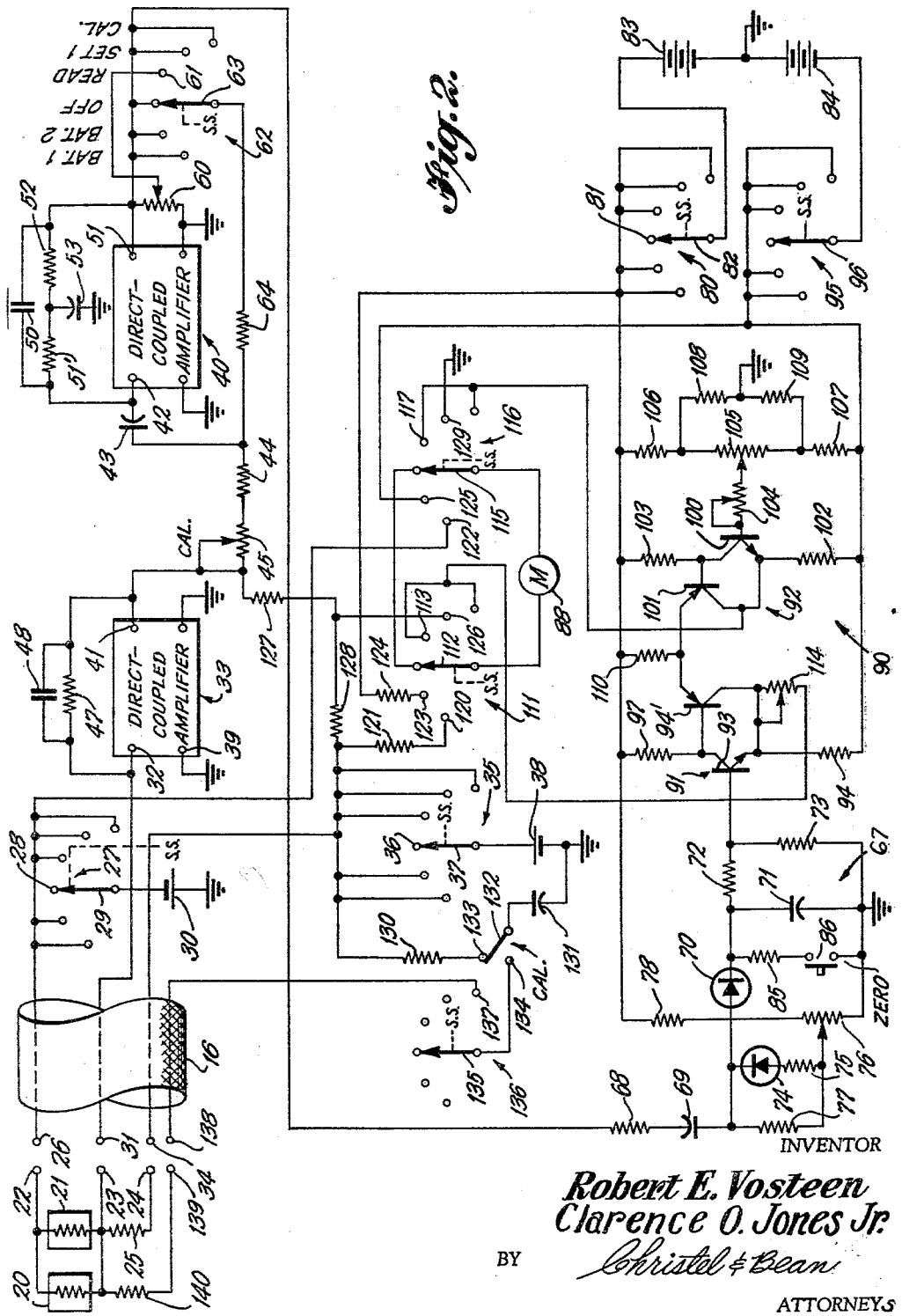

3,169,394
REMOTE PORTABLE LOAD INDICATOR FOR POWER PRESSES AND THE LIKE
Robert E. Vosteen, Medina, and Clarence O. Jones, Jr., Eggertsville, N.Y., assignors to Niagara Machine & Tool Works, Buffalo, N.Y.
Filed May 31, 1961, Ser. No. 113,803
7 Claims. (Cl. 73—88.5)

This invention relates to apparatus for indicating the peak value of a quantity and, more particularly, to apparatus for indicating the peak of a variable input signal, such as the strain on a machine component.

During the operation of presses in which strokes of a plunger or tool of some kind are employed to effect some type of change in the work, such as in a punch press, the structure of the apparatus is exposed to relatively high stress. As a result of that stress, various parts of the apparatus are strained, and, when the apparatus is functioning properly such elements as the columns of a press will experience a normal strain. On the other hand, when the apparatus is not functioning properly, the columns of the press may be overstrained, indicating improper operation of the press. In most cases, the peak value of the strain is the quantity which is of interest and which determines whether or not the apparatus is functioning properly. It is the purpose of this invention to provide apparatus capable of measuring and retaining the peak value of a signal such as the strain on the columns of a press. In particular, the apparatus provides for an indication of peak strain which is retained for a relatively long time period so that an operator can compare the peak strain with the rated strain of the machine and decide whether the machine is operating properly or not.

For the purpose of the invention the usual strain gage, comprising a resistance member which changes its resistance in accordance with the amplitude of the strain of the member to which it is attached, may be appropriately employed. In fact, a number of such strain gages may be mounted on various parts of the machine under test and, if desired, an average reading of the peak strains from the gages may be obtained. The gage or gages are connected to a suitable source of D.-C. voltage to develop current through a circuit of amplitude determined by the magnitude of the gage resistance, and therefore proportional to the magnitude of the strain. Because the change in resistance of the gage is quite small, the current thereby obtained and the voltage which may be developed is extremely small, of the order of microvolts. In order that this voltage can be employed to furnish an indication, it must be amplified, and a direct-coupled amplifier is the most appropriate device for this type. The apparatus of the present invention employs an operational amplifier which is preferably of the type disclosed in Patent No. 3,077,566 entitled "Transistor Operational Amplifier," in the name of Robert E. Vosteen, one of the co-inventors hereof. With an appropriate feedback network, that amplifier furnishes a fairly considerable amount of voltage gain, but greater gain is necessary to operate the indicator. Therefore, the apparatus of the present invention preferably employs a pair of such amplifiers arranged in cascade. The output of the second amplifier is directed to a R-C circuit which has an extremely long discharge time constant and is stored in the capacitor of that circuit. The charge time constant of the circuit is extremely short, so that the voltage representing the peak strain is stored in the capacitor of the R-C circuit and may then be employed to operate a meter.

The apparatus of the present invention is particularly designed for portability, so that the amplifier, R-C circuit and meter may be readily carried from place to place and employed to measure the peak strain on each of several different pieces of apparatus. For such use, the gages may be permanently mounted on the machines which are to be tested and the portable apparatus may appropriately be plugged into a jack connected to the gages, for each machine. Because of the desire for portability and therefore of small current drain, the dynamic portions of the apparatus preferably are semiconductor components. Moreover, since the usual meter movement that might be connected to the R-C circuit of the invention has a very low resistance, there must be some kind of load isolating device between the R-C circuit and the meter. The desire for use of semiconductor components recommends the use of a transistorized isolating device, and the apparatus of the present invention includes a unique type of load isolating device which has a very high input impedance but a very low output impedance.

The apparatus of the invention will now be more fully described in conjunction with drawings showing a preferred embodiment thereof.

In the drawings,

FIG. 1 is a diagrammatic showing of a press with a strain gage mounted thereon, and with the peak indicating device of the invention connected thereto; and FIG. 2 is a schematic diagram showing the peak indicating device in detail, including its connection to the strain gages.

Referring first to FIG. 1, the apparatus of the invention may appropriately be used to measure the peak strain of the column 10 of a punch press generally indicated at 11. A strain gage is generally shown at 12 and is mounted on the forward portion of the column 10 where maximum tensile stress occurs during pressing operation. The gage and any other gages mounted on the machine are connected to a jack 13. A plug 14 cooperates with the jack 13 to connect the peak indicating device generally shown at 15 to the strain gage, through cable 16.

With this apparatus, the indicating device may be carried from machine to machine and plugged into the appropriate jacks to measure the peak strain at each of several different presses.

Referring now to FIG. 2, the strain gages mounted on the machines may include a pair of gages generally shown at 20 and 21 connected in parallel, with their outside terminals connected to terminals 22 and 23. Connected in series from the terminal 23 to a terminal 24 is a resistor 25. Terminal 22 is shown as connected to a terminal 26 which is connected by a conductor of cable 16 to a section 27 of a selector switch identified throughout the drawing as "S.S." It will be seen that all of the stationary contacts of the section 27 are connected to terminal 26, except stationary contact 28. The movable contact 29 of the section 27 is connected to the negative terminal of a battery cell 30, whose positive terminal is grounded.

The terminal 23 of the gage network is connected to a terminal 31 which is connected by a conductor of cable 16 to an input terminal 32 of a direct-coupled amplifier 33. The amplifier 33 is preferably of the operational type described in Patent No. 3,077,566.

The terminal 24 of the gage network is connected to a terminal 34 which is in turn connected by a conductor of cable 16 to each of the stationary contacts of a second selector switch section 35, except contact 36. The selector switch section 35 has a movable contact 37 which moves with the movable contact 29 of selector switch section 27. Movable contact 37 is connected to the positive terminal of a second battery cell 38 whose negative terminal is connected to ground.

With the apparatus so far described with the selector switch in any position but the one shown, and with the terminal 39 of the operational amplifier 33 grounded, it will be seen that there is developed across terminals 32 and 39 of the operational amplifier a voltage which is instantaneously proportional to the average resistance of the strain gages 20 and 21, and is therefore instantaneously proportional to the strain of the machine.

As indicated in the introductory portion of the specification, the voltage at the input to the operational amplifier 33 is necessarily quite small and may be of the order of 60 microvolts open circuit for rated strain on the machine. It will be appreciated that a D.-C. coupled amplifier is the most appropriate device for amplification of such a low amplitude, low frequency voltage to a suitable level. The transistor operational amplifier of Patent No. 3,077,566 is most appropriately used for this purpose, but that amplifier like all transistor amplifiers, is subject to a long-term drift in operation. Moreover, a single operational amplifier of that type would not provide sufficient voltage gain for the apparatus of this invention. We therefore provide a second operational amplifier 40 which is cascaded with the amplifier 33 and which also may be appropriately of the type described in my said copending application. The amplifier 40, as indicated, is preferably of the direct-coupled type, but in order to remove the adverse effects of long-term drift which would be experienced if direct coupling were used throughout, the output terminal 41 of amplifier 33 is connected to the input temrinal 42 of amplifier 40 through a capacitor 43. In fact, this capacitor is connected from terminal 42 to terminal 41 through the series combination of resistor 44 and potentiometer 45. The potentiometer 45 is provided to allow calibration, and need not be further described at this point.

The gain of an operational amplifier is of course set by selection of the values of the input resistance and the feedback resistance. The amplifier 33 is provided with a feedback resistance 47 connected between the terminals 41 and 32 thereof and this feedback resistance may be selected in accordance with the effective resistance across terminals 32 and 39 to provide the desired voltage gain. In an illustrative example, the input resistance was of the order of 30 ohms, and the feedback resistance was 12,000 ohms, giving a gain of about 400.

As is indicated in Patent No. 3,077,566, the operational amplifier is a relatively broadband device. In operation of the apparatus of the invention in a commercial embodiment, any frequencies of input voltage greater than a few hundred cycles merely indicated transients due to external noise and not the strain that was desired to be measured. In order to prevent such transient voltages from adversely affecting the reading obtained by the apparatus, a capacitor 48 is connected across resistor 47 and is selected of such value as to act as substantially a short for high frequency voltages. Accordingly, all high frequency voltages are fed directly back from the output to the input of the amplifier and are not actually amplified to a degree comparable to the amplification afforded low frequency voltages. Similarly, a capacitor 50 is connected between the ungrounded output terminal 51 and the input terminals 42 of the amplifier 40, for the same purpose.

Connected across the capacitor 50 is the series combination of a pair of resistors 51′ and 52. Connected between their junction and ground is a bypass capacitor 53. The combination of resistors 51′ and 52 and capacitor 53 forms a lowpass filter which has a cutoff frequency below the lowest signal frequency and is provided to set the static bias point for the transistor operational amplifier 40. In an illustrative embodiment, resistors 51′ and 52 were each of 100K and capacitor 53 of 50 m.f.d., thereby setting the bias at direct current and frequencies below 1 cycle per second.

The output terminal 51 of amplifier 40 has a potentiometer 60 connected between it and ground. The movable contact of the potentiometer is connected to a stationary contact 61 of a third section 62 of the selector switch. All other stationary contacts of the selector switch section 62 are connected to terminal 51.

The movable contact 63 of the switch section 62 is connected to the junction between the capacitor 43 and resistor 44 in the input circuit to the amplifier 40, through a feedback resistor 64. Thereby, a feedback voltage of amplitude determined by the setting of the potentiometer 60 is provided. This setting is preferably made by an operator in accordance with the rated strain of the machine, so that the indication may be of the percent of rated strain. Rated strain may of course be measured by operating the machine under normal conditions with rated load, and the potentiometer 60 may then be set so that the meter indication is 100% of rated strain.

In an illustrative commercial embodiment, potentiometer 45 was of 5,000 ohms, resistor 44 of 7,500 ohms, potentiometer 60 of 1,000 ohms, and feedback resistor 64 of 100,000 ohms. Thus, with the movable contact of potentiometer 60 set nearest terminal 51 (full scale) the gain of the amplifier was about 10, but when potentiometer 60 was moved to some other setting in accordance with the rated load (or rated strain) of the machine, the gain was of course multiplied by the reciprocal of the percentage of full scale at which the movable contact of potentiometer 60 was set. Thereby, the percent of rated strain is indicated.

The output terminal 51 of the amplifier 40 is connected to an R-C circuit generally indicated at 67 through the series combination of a resistor 68, capacitor 69 and a diode rectifier 70. The R-C circuit includes a capacitor 71 which is connected between the rectifier 70 and ground. The capacitance of capacitor 69 is many times higher than that of capacitor 71, so that short-term changes in the output voltage from amplifier 40 will be transferred directly through capacitor 69 to charge capacitor 71. The diode rectifier 70 of course insures that any charge on capacitor 71 may not discharge back through the input of the R-C circuit 67. For that reason, the diode is preferably of the silicon semiconductor type, by reason of its high reverse resistance.

In a commercial embodiment of the invention, the capacitor 69 was 100 microfarads and the capacitor 71 2 microfarads, thus giving a ratio of 50:1 and causing the capacitor 69 to operate substantially as a short circuit with respect to short-term changes in output voltage of the amplifier. As to long-term changes, of course, the capacitor 69, in effect, causes their removal from the input to the R-C circuit, so that changes caused by drift of the amplifier 40 are effectively removed from the system.

The resistor 68 may be of very low value and is provided to secure an appropriate load for an operational amplifier, a capacitor by itself not being such a load. In a commercial embodiment the resistor 68 was 47 ohms.

The R-C circuit 67 further includes a pair of resistors 72 and 73 connected directly across capacitor 71. These resistors have magnitudes such that the discharge time constant of the R-C circuit 67 is of the order of seconds. In the commercial embodiment resistor 72 was 25 megohms, and resistor 73 was 500 kilohms, thus giving with the 2 microfarads capacitor 71 a time constant of approximately 50 seconds. It will be seen that any peak voltage which charges capacitor 71 will remain on that capacitor for a relatively long period of time.

In operation of the apparatus so far described the voltage output from the operational amplifier at the junction between capacitor 69 and rectifier 70 may overshoot in the opposite direction from that appropriate to charge capacitor 71. In order to bypass such overshoots to ground, a diode rectifier 74 is provided and is connected between that junction and ground through the series combination of a resistor 75 and a portion of a potentiometer 76 determined by the setting of the movable contact of that potentiometer. It is also preferable to discharge any offset voltage that may be obtained due to double differentiation in the system, therefore the series combination of rectifier 74 and resistor 75 is preferably shunted with a fairly high resistor 77. Since this shunt circuit need not be of extremely high resistance, the rectifier 74 may be of the germanium semiconductor type.

The potentiometer 76 is connected between ground and all other stationary contacts of another section 80 of the selector switch except one contact 81, through a resistor 78. The movable contact 82 of the switch is connected through a battery 83 to ground. Battery 83 and a battery 84 provide operating potentials for the various elements of the system, other than the strain gage circuit and may indeed provide bias for the transistor of amplifiers 33 and 40 through appropriate connections (not shown). Potentiometer 76 is provided in the circuit to forward bias diode rectifier 74 so that its offset voltage will not adversely affect the linearity of operation of the system.

After a reading is taken with the apparatus of the invention it is of course desired to discharge the capacitor 71 so that it may be ready to take a charge from the next peak strain to which it is exposed. For that purpose, the capacitor 71 is shunted by the series combination of a resistor 85 and a normally-open pushbutton switch 86. When the pushbutton is depressed, the resistor 85, which may be of relatively low value, is connected directly across capacitor 71 to discharge it quickly.

The voltage across the capacitor 71 is indicated by a meter diagrammatically shown at 88. That meter is appropriately of relatively low resistance, so that it could not be directly connected across the capacitor, since the result would be a very great decrease in the discharge time constant of the R-C circuit 67. The meter movement is therefore preferably isolated from the R-C circuit by a load isolating device 90. This isolating device is preferably of the transistor type, because of portability and current consumption characteristics, but transistor circuits ordinarily do not have extremely high input resistances of the order of the total resistance of the R-C circuit 67. For that reason, resistors 72 and 73, bearing the magnitude relationship described above, are employed, and the output voltage from the R-C circuit is obtained from across resistor 73. In the commercial embodiment resistor 73, as indicated above, was of the order of 500K and the isolating circuit now to be described provides an input resistance high as compared with that order of magnitude.

The isolating device 90 includes a first and a second pair of opposite polarity transistors 91 and 92. The first pair includes NPN transistor 93 and PNP transistor 94'. The base of transistor 93 is connected to the junction between resistors 72 and 73, while the emitter of the transistor is connected through an appropriate resistor 94 to all but one of the stationary contacts of a further section 95 of the selector switch. The movable contact 96 of that section is connected to the negative terminal of battery 83 while the positive terminal thereof is grounded.

The emitter of transistor 93 is connected directly to the collector of transistor 94', while the base of the latter transistor is connected directly to the collector of transistor 93. The junction between the last two elements is connected through an appropriate resistor 97 and the selector switch section 80 to the positive terminal of battery 83.

The second pair of transistors includes a NPN transistor 100 and a PNP transistor 101. These two transistors are connected in the same fashion as transistors 93 and 94', with emitter resistor 102 and collector resistor 103, but the base of the input transistor 100 is statically biased through the network now to be described. That network includes a potentiometer 104 which is connected between the base of transistor 100 and the movable contact of a second potentiometer 105. Potentiometer 105 is connected across the batteries 83 and 84 through the selector switch sections 80 and 95 and through divider resistors 106 and 107. Connected directly across potentiometer 105 is the series combination of resistors 108 and 109. The junction between these two resistors is grounded. The potentiometers 104 and 105 provide appropriate stabilization and zeroing controls as will be explained hereinafter.

The emitters of transistors 94' and 101 are connected to the positive terminal of battery 82 through an appropriate resistor 110 and the selector switch section 80.

The emitter of transistor 93 is connected to one terminal of meter 88 through a further section 111 of the selector switch, the movable contact 112 being connected to the meter and one of the stationary contacts 113 being connected to the emitter of transistor 93 through a calibration potentiometer 114. The other terminal of meter 88 is connected to movable contact 115 of further section 116 of the selector switch, and one stationary contact 117 thereof is connected directly to the emitter of transistor 100. Thereby, the input current to the meter is derived from the emitter circuits of transistors 93 and 100, these transistor circuits being connected in differential fashion so that any drift to which they are exposed is automatically compensated.

The load isolating device 90, because of its emitter follower type connection, has a very low output resistance, together with a very high input resistance. The voltage gain obtained from the device is substantially unity, but the current gain is very high. The device therefore functions very excellently for the isolating purpose.

In operation of the apparatus so far described, it will be seen that when the various selector switch sections are each in position such that the movable contact engages the fixed contact vertically above the movable contact, the instrument is at the Off condition. Reference to switch sections 111 and 115 will show that the meter is directly shorted, while reference to switch sections 80 and 95 will show that the batteries 83 and 84 are unconnected, with the selector switch Off. When a reading is to be taken of the peak strain of a machine, the plug of the indicator is positioned in the jack of the machine and the potentiometer 60 is adjusted to the press factor, which has previously been determined as the rated strain of the machine. Then, the selector switch is moved to the "Read" position, the stationary contact immediately to the right of the Off contact in the drawing in FIG. 2. Selector switch sections 80 and 95 thereby connect the batteries 83 and 84 to the transistor circuits, and switch sections 27 and 37 connect the batteries 30 and 38 to the strain gage network. After the apparatus has had a chance to reach proper operating condition, the Zero pushbutton switch 86 is depressed to discharge the storage capacitor 71, and the meter reading is then adjusted to Zero by adjustment of potentiometer 105 in the load isolator network. Then, the Zero pushbutton is released and the machine is placed in operation. The peak strain will be indicated on the meter 88 and that reading may be noted and, if desirable, recorded. The selector switch may then be turned to the Off condition and the indicator plug removed from the jack for a test of another machine.

In order that the condition of batteries 30 and 38 may be checked, the selector switch is provided with a "BAT. 1" position. In that position, the movable contact 112 of switch section 111 engages stationary contact 120, which is connected through resistor 121 to all of the stationary contacts of switch section 35, except contact 36. The movable contact 115 of switch section 116 is engaged with stationary contact 122 which is connected to all of the stationary contacts of switch section 27, except the Off contact 28. Thereby, cells 30 and 38 are connected in series with resistor 121 across meter 88. The meter is appropriately calibrated so that a reading of midscale thereon corresponds to the minimum usable battery voltage. A reading less than that amount then indicates replacement of cells 30 and 38.

In the "BAT. 2" condition of the selector switch, movable contact 112 of switch section 111 engages contact 123 which is connected through a resistor 124 to all of the stationary contacts of switch section 80, except the "Off" contact 81. Movable contact 115 of switch section 116 engages stationary contact 125, which is connected to all of the stationary contacts of switch section 95, except the "Off" contact. Thereby, batteries 83 and 84 are connected through resistor 124 directly across the meter, and resistor 124 is preferably of such value that a meter indication below midscale again indicates battery replacement.

In the "SET 1" selector switch position, the zero adjustment of the amplifier 33 may be made. As indicated in the said copending application, the operational amplifier is preferably of the differential type, with an adjustment for balancing the collector voltages of the input transistors, appropriately by movement of the movable contact of a potentiometer whose outer terminals are connected to the transistor collectors and whose movable contact is connected to the battery supply. For this purpose, selector switch section 111 is provided with a stationary contact 126 which is connected through a resistor 127 to the output terminal 41 of amplifier 33 and through a resistor 128 to the stationary contacts of switch section 35. Similarly, switch section 116 has a grounded stationary contact 129.

With the selector switch in the "SET 1" position, the output of amplifier 33 is connected across meter 88, but also connected across the meter is the series combination of resistor 128 and battery cell 38. The latter connection biases the meter to mid-point, so that the zero adjustment of the amplifier may be made while observing deflection to either side of the zero point.

Finally, the "CAL." position of the selector switch enables adjustment of the indicator under, in effect, a standard input resistance change. For this purpose, the series combination of a resistor 130, a capacitor 131, and the movable contact 132 and one stationary contact 133 of a single-pole, double-throw CAL. switch are connected across battery cell 38 through selector switch section 35. The CAL. switch is preferably of the pushbutton type and, when it is depressed, its movable contact 132 engages a second fixed contact 134 which is connected to the movable contact 135 of a further selector switch section 136. When in the "CAL." position, movable contact 135 engages a fixed contact 137 which is connected through a lead of cable 16 to a terminal 138. That terminal is connected to a terminal 139 of the gage network when the plug 14 engages jack 13. Terminal 139 is connected through a resistor 140 to terminal 23.

With the selector switch in the "CAL." position, and with the capacitor 131 fully charged, when the CAL. pushbutton switch is depressed, the charge on the capacitor discharges through resistor 140, thus feeding the input to amplifier 33 a current pulse of the precise peak amplitude to produce the desired preselected reading of meter 88. The "CAL." potentiometer 45 may then be adjusted to give a preselected reading of the meter 88, such as full-scale, the value of resistance 140 being selected for that purpose.

The operation of the apparatus of the preferred embodiment of the invention will be apparent from the above description. It will also be apparent that many minor changes could be made in that apparatus without departure from the scope of the invention. The invention is therefore not to be considered limited to the description hereinabove of the preferred embodiment, but rather only by the scope of the appended claims.

We claim:

1. Apparatus for indicating the peak value of the strain on a machine member comprising at least one strain gage mounted on said member and a portable apparatus for connection to said strain gage for measurement of its peak resistance, said portable apparatus including a battery connectable in a closed circuit with said strain gauge to develop a current therethrough of amplitude determined by the instantaneous resistance of the gage, a direct current amplifier directly connectable to said gage to measure the instantaneous current therethrough, means capacitively connected to the output of said amplifier including an R-C circuit having a relatively low charging time constant and an extremely high discharge time constant for developing a voltage of amplitude proportional to the peak amplitude of the amplified input signal, said R-C circuit including the series combination of a diode rectifier and a first capacitor, said means capacitively connected to the output of said amplifier including a second capacitor to furnish said capacitive coupling, said second capacitor being of very much higher capacity than said first capacitor, said second capacitor, diode rectifier and first capacitor being connected in series across the output of said direct current amplifier so that short-time changes in the output of the amplifier are transferred to said first capacitor, and means connected across said first capacitor for indicating said voltage, said R-C circuit including a capacitor and at least one resistor connected thereacross and having a relatively high resistance and said indicating means including a meter having a relatively low resistance, and a load-isolating device connected between said resistor and said meter, said isolating device having an input resistance high as compared with said resistor and a low output resistance, said load isolating device including a pair of opposite polarity transistors having the base-emitter circuit of one transistor connected across said resistor, the base of the other transistor directly connected to the collector of said one transistor and the collector of said other transistor directly connected to the emitter of said one transistor, and means for appropriately biasing said transistors, said meter being connected to the emitter of said one transistor.

2. Apparatus for indicating the peak value of the strain on a machine member comprising at least one strain gage mounted on said member and a portable apparatus for connection to said strain gage for measurement of its peak resistance, said portable apparatus including a battery connectable in a closed circuit with said strain gage to develop a current therethrough of amplitude determined by the instantaneous resistance of the gage, a direct current amplifier directly connectable to said gage to measure the instantaneous current therethrough, means capacitively connected to the output of said amplifier including an R-C circuit having a relatively low charging time constant and an extremely high discharge time constant for developing a voltage of amplitude proportional to the peak amplitude of the amplified input signal, said R-C circuit including the series combination of a diode rectifier and a first capacitor, said means capacitively connected to the output of said amplifier including a second capacitor to furnish said capacitive coupling, said second capacitor being of very much higher capacity than said first capacitor, said second capacitor, diode rectifier and first capacitor being connected in series across the output of said direct current amplifier so that short-time changes in the output of the amplifier are transferred to said first capacitor, and means connected across said first capacitor for indicating said voltage, said R-C circuit including a capacitor and at least one resistor connected thereacross and having a relatively high resistance and said indicating means including a meter having a relatively low resistance, and a load-isolating device connected between said resistor and said meter, said isolating device having an input resistance high as compared with said resistor and a low output resistance, said load isolating device including two pairs of opposite polarity transistors having the base-emitter circuit of one transistor of one pair connected across said resistor, the collectors of said one transistor and the corresponding polarity transistor of the other pair respectively directly connected to the bases of the other transistors of their pairs with the emitters of said one transistor and said corresponding polarity transistor respectively directly connected to the collectors of the other transistors of their pairs, means for appropriately biasing said transistors, said meter being connected between the emitters of said one and said corresponding polarity transistors.

3. Apparatus for indicating the peak value of the strain on a machine member comprising at least one strain gage mounted on said member and a portable apparatus for connection to said strain gage for measurement of its peak resistance, said portable apparatus including a battery connectable in a closed circuit with said strain gage to develop a current therethrough of amplitude determined by the instantaneous resistance of the gage, a first and a second direct current amplifier each of amplification too low for building up current changes through said gage to a level suitable for indication but of cascaded gain satisfactory therefor, and each amplifier being subject to long-term drift, said first amplifier being directly connected to said gage to measure the instantaneous current therethrough, the output of said amplifier being capacitively connected to the input of said second amplifier to minimize the effects of long-term drift of the first amplifier, and an R-C circuit including the series combination of a first capacitor, a rectifier and a second capacitor connected across the output of said second amplifier, the capacitance of said first capacitor being many times higher than the capacitance of said second capacitor so that voltages representing peak strains are transferred from the second amplifier through said first capacitor into said second capacitor for storage thereby, and means for indicating the voltage across said second capacitor.

4. The apparatus of claim 3 in which said R-C circuit further includes at least one very large resistance resistor connected across said second capacitor, said indicating means includes a meter having a low resistance, and a load isolating device connected between said large resistance resistor and said meter, said device having a high input resistance and a low output impedance.

5. Apparatus for indicating the peak strain of a machine as sensed by at least one strain gage mounted on the machine comprising a first and a second direct-current amplifier each subject to drift and capacitively coupled in cascade to minimize the effects of drift, a direct voltage source for connection in series circuit with said gage to develop a voltage across the gage instantaneously indicative of the strain of the machine, said first amplifier being designed for direct connection across said gage, at least a first and a second resistor respectively connected between output and input of said first and second amplifiers to furnish stabilizing degenerative feedback, first and second capacitors respectively connected across said first and second resistors to feedback relatively high frequencies indicative only of external noise in said machine, a third capacitor, at least a third resistor connected across said third capacitor and having a very large resistance such that the discharge time constant of the R-C network formed by said third resistor and third capacitor is of the order of seconds, the series combination of a fourth capacitor and a diode rectifier connected between the output of said second amplifier and said R-C circuit, said fourth capacitor being many times the capacitance of said third capacitor to transfer voltage changes representing strain changes directly to said third capacitor for storage thereby, a meter operative to indicate the magnitude of the current therethrough and having a relatively low resistance, and a load isolating device connected between said R-C network and said meter, said device having a high input resistance and a low output impedance.

6. The apparatus of claim 5 in which said R-C circuit includes both said third resistor and a fourth resistor connected in series across said third capacitor, said third resistor being many times as large as said fourth resistor, said isolating device being of the transistorized type and having low voltage gain but high current gain and being connected across said fourth resistor to develop an output current responsive to the voltage across that resistor.

7. The apparatus of claim 6 including the series combination of a fifth low resistance resistor and a switch connected across said third capacitor so that it may be discharged between strain measurements.

References Cited by the Examiner

UNITED STATES PATENTS

| 2,448,322 | 8/48 | Piety | 73—35 |
| 2,508,996 | 5/50 | Elam | 73—35 X |
| 2,619,833 | 12/52 | Burne et al. | 73—88.5 |
| 2,775,118 | 12/56 | Legge et al. | 73—88.5 |
| 2,924,968 | 2/60 | Colten et al. | 73—88.5 |
| 2,995,712 | 8/61 | Montgomery | 330—19 |

OTHER REFERENCES

Perry and Lissner: "The Strain Gage Primer," McGraw-Hill Book Co., Inc., New York, 1955, pages 72 and 73, FIGURES 5–6 and 5–7.

RICHARD C. QUEISSER, *Primary Examiner.*

JOSEPH P. STRIZAK, *Examiner.*